(12) United States Patent
Hundemer (10) Patent No.: US 9,350,966 B1
(45) Date of Patent: May 24, 2016

(54) SYSTEMS AND METHODS FOR ASSIGNING ATTRIBUTES TO RECORDED VIDEO

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 489 days.

(21) Appl. No.: 13/829,476

(22) Filed: Mar. 14, 2013

(51) Int. Cl.
*H04N 9/80* (2006.01)
*H04N 9/79* (2006.01)

(52) U.S. Cl.
CPC ........................................ *H04N 9/79* (2013.01)

(58) Field of Classification Search
CPC .......................................................... H04N 9/79
USPC ........................... 386/241, 248, 249, 250, 291
See application file for complete search history.

(56) References Cited

U.S. PATENT DOCUMENTS

| 5,541,738 A * | 7/1996 | Mankovitz ..................... 386/245 |
| 2003/0123841 A1* | 7/2003 | Jeannin ........................... 386/46 |

\* cited by examiner

*Primary Examiner* — Robert Chevalier
(74) *Attorney, Agent, or Firm* — McDonnell Boehnen Hulbert & Berghoff LLP (57) ABSTRACT

In one aspect, a method involves (i) selecting a log-entry, wherein the log entry corresponds to a streaming-video source; (ii) causing streaming video to start being channeled from the streaming-video source to an air-chain system; (iii) making a determination that the log-entry includes a special identifier; (iv) responsive to making the determination, causing a recording device to start recording the streaming video; (v) causing a set of commercial VCs to be sent to the air-chain system; (vi) causing the recording device to stop recording the streaming video; (vii) determining a beginning and an ending position of at least two show-segment VCs included in the recorded video, wherein the at least two show-segments are separated by a commercial break; and (viii) for each of the show-segment VCs included in the recorded video, assigning a corresponding segment identifier and the corresponding determined beginning and ending positions to the recorded video.

20 Claims, 8 Drawing Sheets

SYSTEMS AND METHODS FOR ASSIGNING ATTRIBUTES TO RECORDED VIDEO

USAGE AND TERMINOLOGY

Throughout this application, with respect to all reasonable derivatives of such terms, and unless otherwise specified (and/or unless the particular context clearly dictates otherwise), each usage of:
"a" or "an" is meant to read as "at least one."
"the" is meant to be read as "the at least one."
the term "video" refers to any material represented in a video format (i.e., having multiple frames). In some instances, video may include multiple sequential frames that are identical or nearly identical, and that may give the impression of a still image. Video may or may not include an audio portion.
the term "video component" (VC) refers to video that one of ordinary skill in the art would typically consider to be self-contained, and that is typically separately scheduled by a traffic system (also referred to as a scheduling-and-sequencing system) of a television-broadcasting system.

TECHNICAL FIELD

The disclosed systems and methods relate generally to television-broadcasting technology.

BACKGROUND

A television-broadcasting system typically includes a traffic system that performs functions related to broadcast scheduling. For example, the traffic system may facilitate the creation of a traffic-log (log), which is a broadcast schedule for a given station during a given time period. The log may include multiple ordered log entries, each of which may correspond to a VC. Each log entry may also include scheduling data for the video, and therefore the log may generally represent the scheduled sequence of VCs intended to be broadcast during the corresponding time period.

There are several types of VCs, non-limiting examples of which include a show-segment VC, a commercial VC, and a promotion VC. A show-segment VC consists of at least a portion of a show, and potentially one or more commercials. A show may be, for example, an episode of a sitcom, a news program, or a movie. A commercial VC consists of a single commercial. Typically, a television-broadcasting company broadcasts a commercial VC in exchange for payment or other compensation from the provider of the commercial VC. A promotion VC consists of video that promotes something such as an event or another VC. Unlike a commercial VC, the television-broadcasting company typically does not receive a payment or other compensation from a third-party for broadcasting the promotion VC.

The traffic system may communicate with a master control system (MCS), which is the technical hub of a television-broadcasting system and is typically the final point before video is sent to an air-chain system for broadcast. More specifically, the traffic system typically communicates with an automation system of the MCS. The automation system is the logic center of the MCS and may cause the MCS and/or another entity to perform various functions.

Through a communication path, the traffic system may provide the log to the automation system, such that the automation system may traverse and select log entries. The automation system may then cause the MCS and/or another entity to perform certain functions for each selected log-entry at an appropriate time (e.g., at the corresponding start time). For example, the automation system may cause a recording-and-playout device (RAPD) to retrieve and playout a stored VC such that it may be channeled through one or more entities within the MCS (e.g., routers and switchers), and sent to an air-chain system for broadcast. In another example, the automation system may cause a streaming VC received from a streaming-video source (SVS) to be channeled through the MCS and sent to the air-chain system for broadcast.

SUMMARY

In one aspect, a method for use in a television-broadcasting system is disclosed. The method involves (i) selecting a log-entry from a traffic log, wherein the log entry corresponds to a streaming-video source and to a start time; (ii) causing streaming video to start being channeled from the streaming-video source to an air-chain system for broadcast proximate the start time; (iii) making a determination that the log-entry includes a special identifier; (iv) responsive to making the determination, causing a recording device to start recording the streaming video proximate the start time; (v) while the recording device records the streaming video, causing a set of commercial VCs to be sent to the air-chain system for broadcast; (vi) causing the recording device to stop recording the streaming video; (vii) determining a beginning and an ending position of at least two show-segment VCs included in the recorded video, wherein the at least two show-segments are separated by a commercial break, and wherein a timing of the commercial break corresponds to a timing of the sending of the set of commercial VCs to the air-chain system; and (viii) for each of the at least two show-segment VCs included in the recorded video, assigning to the recorded video a corresponding segment identifier and the corresponding determined beginning and ending positions.

In another aspect, a method for use in a television-broadcasting system having an automation system is disclosed. The method involves (i) the automation system selecting a log-entry from a traffic log, wherein the log entry corresponds to a streaming-video source and to a start time; (ii) the automation system causing streaming video to start being channeled from the streaming-video source to an air-chain system for broadcast proximate the start time; (iii) the automation system making a determination that the log-entry includes a special identifier; (iv) responsive to the automation system making the determination, the automation system causing a recording device to start recording the streaming video proximate the start time; (v) while the recording device records the streaming video, the automation system causing a set of commercial VCs to be sent to the air-chain system for broadcast; (vi) the automation system causing the recording device to stop recording the streaming video; (vii) the automation system determining a beginning and an ending position of at least two show-segment VCs included in the recorded video, wherein the at least two show-segments are separated by a commercial break, and wherein a timing of the commercial break corresponds to a timing of the sending of the set of commercial VCs to the air-chain system; and (viii) for each of the at least two show-segment VCs included in the recorded video, the automation system assigning to the recorded video a corresponding segment identifier and the corresponding determined beginning and ending positions.

In another aspect, a television-broadcasting system includes a (i) a streaming-video source; (ii) an air-chain system connected to the streaming-video source; (iii) a recording device connected to the streaming-video source; and (iv) an automation system having a computer-readable medium including a set of program instructions, that when executed by the automation system, cause the automation system to perform a set of functions. The set of functions includes (i) selecting a log-entry from a traffic log, wherein the log entry corresponds to the streaming-video source and to a start time; (ii) causing streaming video to start being channeled from the streaming-video source to the air-chain system for broadcast proximate the start time; (iii) making a determination that the log-entry includes a special identifier; (iv) responsive to making the determination, causing the recording device to start recording the streaming video proximate the start time; (v) while the recording device records the streaming video, causing a set of commercial VCs to be sent to the air-chain system for broadcast; (vi) causing the recording device to stop recording the streaming video; (vii) determining a beginning and an ending position of at least two show-segment VCs included in the recorded video, wherein the at least two show-segments are separated by a commercial break, and wherein a timing of the commercial break corresponds to a timing of the sending of the set of commercial VCs to the air-chain system; and (viii) for each of the at least two show-segment VCs included in the recorded video, assigning to the recorded video a corresponding segment identifier and the corresponding determined beginning and ending positions.

DETAILED DESCRIPTION OF THE DRAWINGS

I. Overview

In the television-broadcasting industry, traffic systems are provided by multiple vendors and often include distinguishing features. However, for a variety of reasons such as to provide compatibility, many traffic systems create logs according to a general industry-wide standard. Likewise, many automation systems are configured to receive and process logs based on this standard. A log entry based on this standard may include certain attributes, including for example a house identifier, a source identifier, a description, an episode identifier, a segment identifier, one or more auxiliary notations, a duration, a start-time type, and/or a start time. These attributes may be generated automatically (e.g., by the traffic system) or may be provided by a user such as a traffic manager.

Typically, a log entry includes one of either a house identifier or a source identifier. If the log entry corresponds to a stored VC, the log entry typically includes a house identifier (sometimes called a "house number"), which identifies the stored VC. Typically, a house identifier is a unique identifier within a given television-broadcasting system, and maps to a file location in a data storage where the VC is stored. As such, by obtaining the house identifier of a log entry, the automation system may use a mapping table to determine the appropriate file location, and may then cause the VC that is stored in that file location to be retrieved. Alternatively, if the log entry corresponds to a streaming VC, the log entry may include a source identifier, which identifies an SVS (e.g., via a mapping table) that provides the streaming VC.

The description provides a title and/or other information about the corresponding VC. For example, the description may be a title of a show. The episode identifier (sometimes called an "episode number") identifies a particular episode of a show, and the segment identifier (sometimes called a "segment number") identifies a particular segment of the episode of the show. The episode identifier and the segment identifier are included in a log entry that corresponds to a show-segment VC. The one or more auxiliary notations are typically notes that are reviewed by a user (e.g., a traffic manager may provide a note to a master control operator about the corresponding log entry). The duration indicates the duration of the corresponding VC. In some instances, the duration may be unknown and therefore it may not be included in the log entry.

The start-time type indicates how and/or when the start time is determined. The start-time type may be absolute, calculated, or manual. An absolute start-time type indicates that the start time is a fixed time that may be determined before any log entries in the log are processed. This is sometimes referred to as a "hard" start time. A calculated start-time type indicates that the start time is when the preceding log entry has "completed" (i.e., when the VC of the previous log entry has played for its corresponding duration), and may be determined when the start time and duration of the previous log entry are known. A manual start-time type indicates that the start time is when a request is received from a user or device, and therefore is determined when the request is received. As such, each log entry corresponds to a start time.

The above-described attributes may be stored in corresponding fields in the log entry. For example, the house identifier may be stored in a house-identifier field and the one or more auxiliary notations may be stored in one or more auxiliary-notation fields. Two examples of well-known traffic systems that use the attributes as described above include WO Traffic provided by WideOrbit Inc. of San Francisco, Calif., and OSi-Traffic™ provided by Harris Corporation of Melbourne, Fla.

In some instances, multiple log entries in a log may be conceptually grouped together as having an association with a single show. For example, where a show consists of four show segments, the group may consist of four log entries, each corresponding to a different show-segment VC. Grouped log entries typically have a common description (e.g., the title of the show) in their respective description fields. However, grouped log entries are not necessarily sequential and continuous. Indeed, log entries within a group may be separated by other log entries, such as those corresponding to commercial VCs.

As another example where a show consists of five show segments, the group may include five log entries, each corresponding to a single streaming-video source. Provided that the five log entries are scheduled in accordance with a scheduling protocol used by the streaming-video provider, the five log entries may therefore correspond to five show segment VCs in the form of streaming VCs.

In some instances, it may be desired to record streaming video being broadcast on one channel such that it may be broadcast on a second channel. The second broadcast may occur contemporaneously with or after the first broadcast.

One approach to recording streaming video for this purpose is to split the video as it leaves the MCS, such that one copy may be sent to the air-chain system for broadcast, while another copy may be sent to a recording device. However, when using this approach, the recorded video includes not only the show-segment VCs, but also the intervening commercials, or other VCs exactly as arranged in the first broadcast.

Since the streaming video may be broadcast on a different channel and/or at a different time, it may be desired to modify the arrangement (i.e., the length or position) of commercial breaks in the second broadcast, such as to provide a schedule that maximizes viewer ratings. Further, it may be desired to include entirely different commercial VCs in the second broadcast, such as to target a different audience. Modifying commercial breaks and/or replacing commercials in the recorded video is often a manually intensive process where a user analyzes the recorded video and determines where the commercial breaks occur such that they may be modified and/or such that commercial VCs may be replaced. Automated systems for identifying commercial breaks may be also used, however they often have inaccurate results and/or may be limited in that they may not be able to be applied in real time as the streaming video is being recorded (i.e., to handle the instance where a second broadcast is contemporaneous with the first broadcast).

The disclosed systems and methods improve upon this approach. In one aspect, a method involves recording streaming video and then determining the beginning and ending positions of show-segment VCs included in the recorded video. The automation system makes this determination based on the times that it broadcasts intervening commercial VCs. The automation system then assigns attributes such as a house identifier, a segment identifier, and the determined positions to the recorded video such that an automation system may schedule the included show-segment VCs just like any other VCs. Therefore, the automation system may schedule the show-segment VCs together with any commercials VCs as desired for use in the second broadcast.

II. Example Television-Broadcasting System

Figure 1:
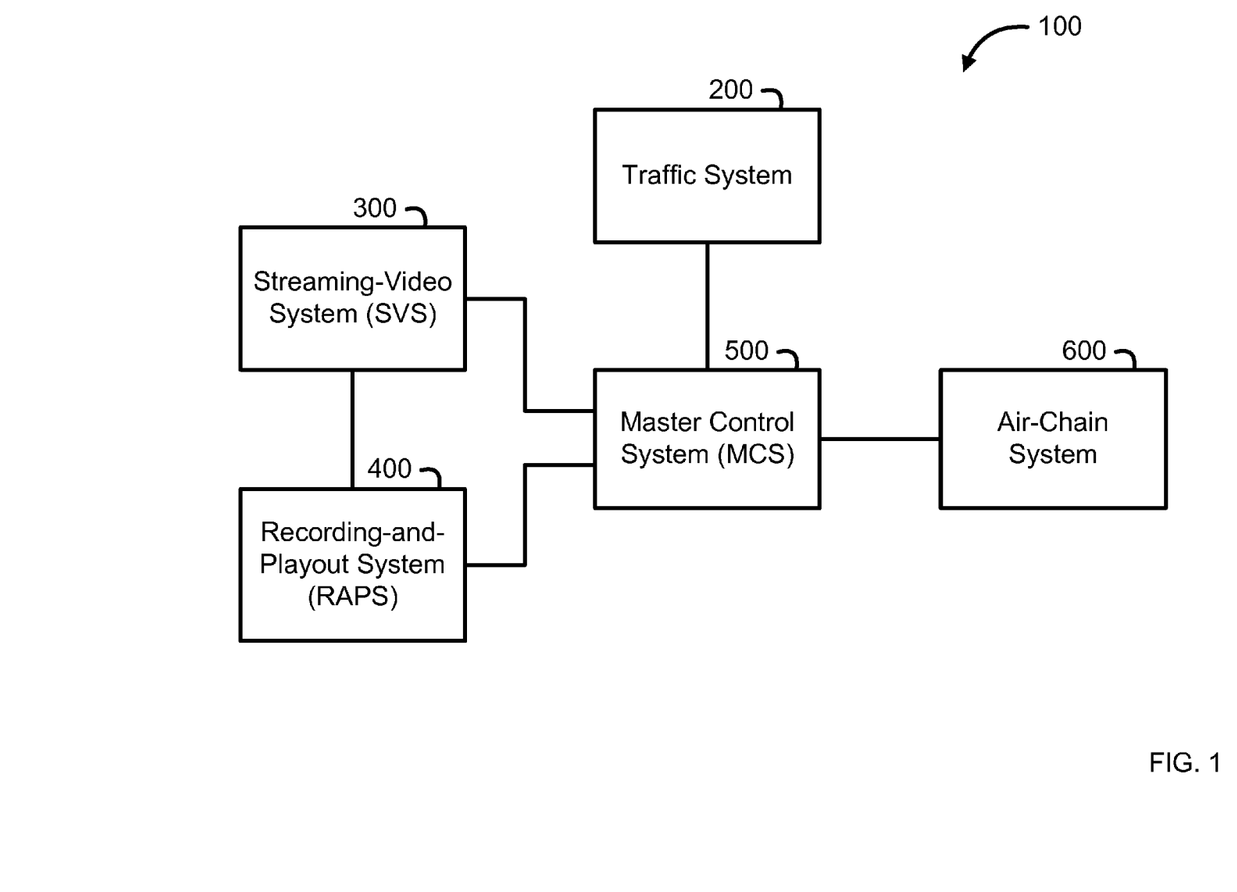
FIG. 1 is a simplified block diagram of an example television-broadcasting system.

FIG. 1 shows an example television-broadcasting system, generally designated 100. The television-broadcast system 100 may be configured to perform a variety of functions that relate to television broadcasting. The television-broadcasting system 100 may include a traffic system 200, a streaming-video system 300, a recording-and-playout system (RAPS) 400, a MCS 500, and an air-chain system 600. The MCS 500 may serve as the hub of the television-broadcasting system 100 and may connect to each of the traffic system 200, the streaming-video system (SVS) 300, the RAPS 300, and the air-chain system 600. Generally, the television-broadcasting system 100 may be configured such that video may be sent from the RAPS 300, the streaming-video system 400, or another source, through the MCS 500, and to the air-chain system 600 for broadcast.

A. Traffic System

Figure 2:
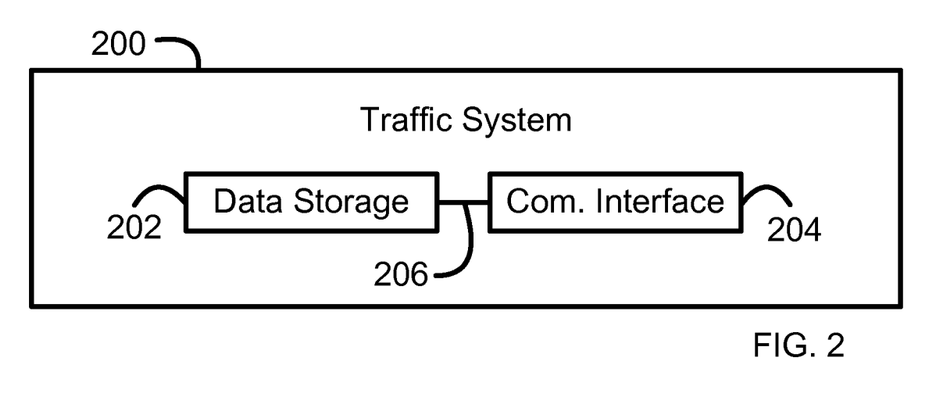
FIG. 2 is a simplified block diagram of an example traffic system.

FIG. 2 shows the traffic system 200 in greater detail. The traffic system 200 may be configured for creating and sending a log to the MCS 500, and may include a data storage 202 and a communication interface 204, both of which may be connected to each other via a connection mechanism (e.g., a bus) 206. The traffic system 200 may be configured to store logs in the data storage 202, and to send the stored logs, via the communication interface 204, to the MCS 500. As discussed above, two example traffic systems are WO Traffic provided by WideOrbit Inc. of San Francisco, Calif., and OSi-Traffic™ provided by Harris Corporation of Melbourne, Fla.

B. SVS

Figure 3:
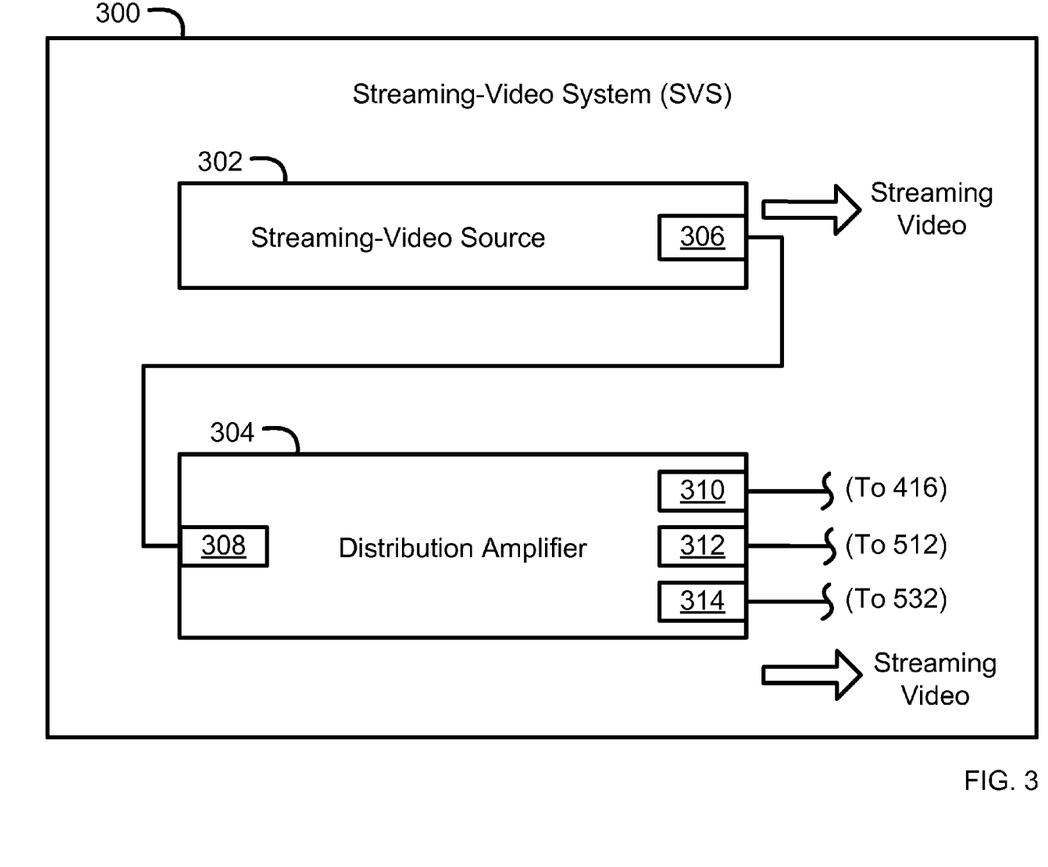
FIG. 3 is a simplified block diagram of an example streaming-video system.

FIG. 3 shows the SVS 300 in greater detail. The SVS 300 may be configured to distribute streaming video (e.g., a streaming VC). Streaming video is video that is often received at or shortly before the time when the video is broadcast. The SVS 300 may include a streaming-video source 302, such as a satellite (that may stream so-called "network television" streaming video) or a newsroom production control system (that may stream so-called "newsroom" streaming video). In one example, the streaming-video source 302 may send streaming video based on the high-definition serial digital interface (HD-SDI) standard with a data transfer rate of 1.485 Gbps.

The SVS 300 may also include a distribution amplifier 304 that may be used to distribute copies of the streaming video to multiple destinations. In one example, the streaming-video source 302 may include an output 306 that is connected to an input 308 of the distribution amplifier 304. Therefore, the streaming video sent from the streaming-video source 302 may be distributed to one or more destinations via respective outputs of the distribution amplifier 304, including for example a first output 310, a second output 312, and a third output 314.

C. RAPS

Figure 4:
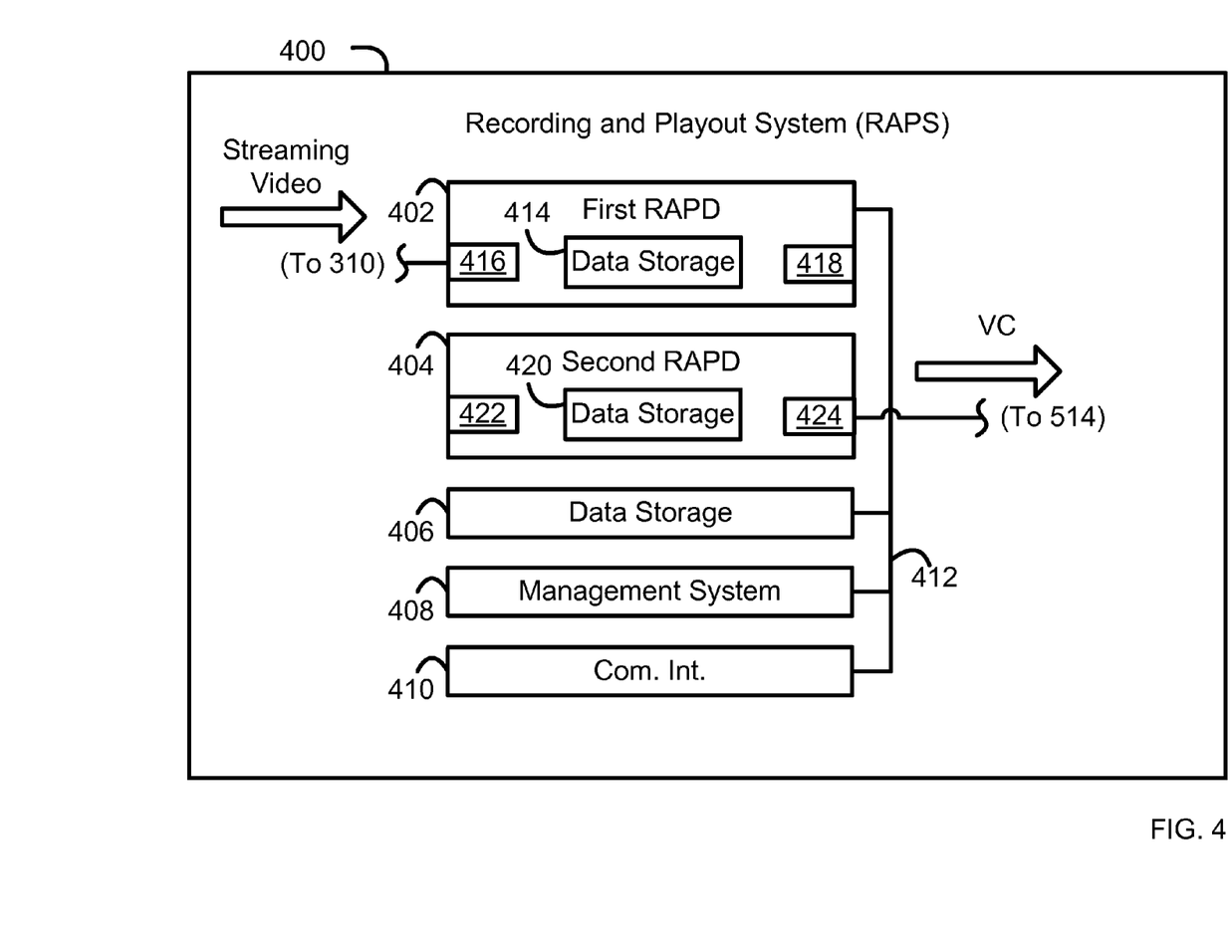
FIG. 4 is a simplified block diagram of an example recording-and-playout system.

FIG. 4 shows the RAPS 400 in greater detail. The RAPS 400 may be configured to record and/or playout video (e.g., VCs) for use by the MCS 500, and may include a first recording-and-playout device (RAPD) 402, a second RAPD 404, a data storage 406, a management system 408, and a communication interface 410, each of which may be connected to each other via a connection mechanism 412.

The first RAPD 402 may be configured to record and/or playout video, such as by sending video via the MCS 500 to the air-chain system 600. The first RAPD 402 may include a data storage 414, an input 416, and an output 418, all of which may be connected to each other by a connection mechanism (not shown). The output 310 of the distribution amplifier 304 may be connected to the input 416 of the first RAPD such that the first RAPD 402 may record streaming video received from the streaming-video source 302.

The second RAPD 404 may also be configured to record video and playout video, such as by sending video via the MCS 500 to the air-chain system 600. The second RAPD 402 may include a data storage 420, an input 422, and an output 424, all of which may be connected to each other by a connection mechanism (not shown).

The management system 408 may be configured to manage the RAPDs 402, 404 by organizing and moving video back-and-forth between the RAPDs and the data storage 406. The communication interface 410 may connect the RAPS 400 to the MCS 500 or to another entity. An example of a RAPD is the K2 server provided by Grass Valley™ of San Francisco, Calif.

D. MCS

Figure 5:
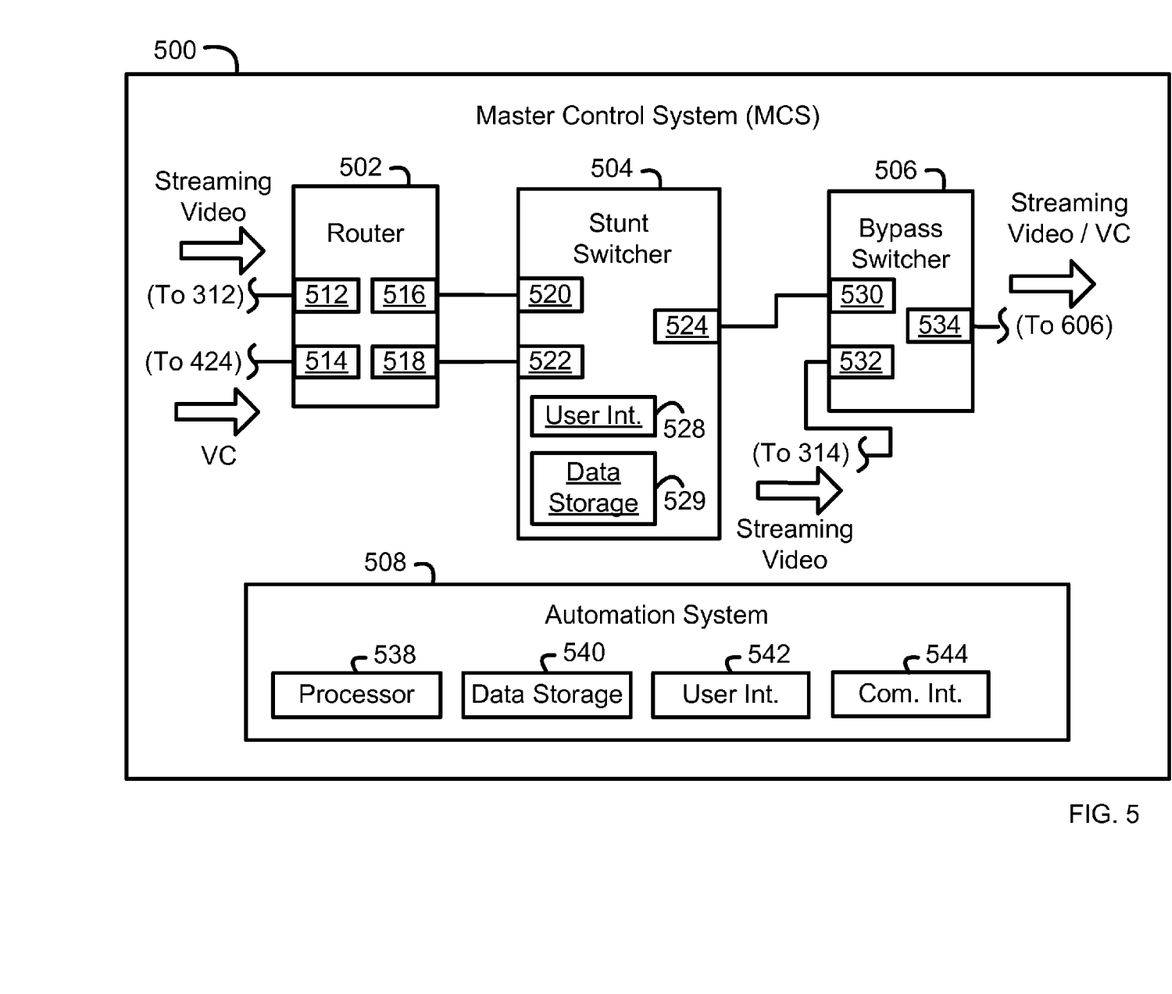
FIG. 5 is a simplified block diagram of an example master control system.

FIG. 5 shows the MCS 500 in greater detail. The MCS 500 may be configured to receive video, channel the video through one or more sources, and send the video to the air-chain system 600 for broadcast. In one example, the MCS 500 includes a router 502, a stunt switcher 504, a bypass switcher 506, and an automation system 508, each of which may be connected to each other by a connection mechanism (not shown)

1. Router

The router 502 may be configured to channel video by mapping inputs to outputs, and may include one or more inputs, including for example, a first input 512 and a second input 514, and one or more outputs, including for example, a first output 516 and a second output 518. The router 502 may also include a communication interface (not shown). The inputs 512, 514, the outputs 516, 518, and the communication interface may each be connected to each other by a connection mechanism (not shown). Notably, a router may and often does have more inputs than outputs such that it may connect many sources to relatively fewer destinations.

The distribution amplifier 304 may be connected to the router 502 via the output 312 and the input 512. As such, the streaming-video source 302 may send streaming video via the distribution amplifier 304 to the router 502. The second RAPD 404 may be connected to the router 502 via the output 424 and the input 514. Therefore, the second RAPD 404 may send VCs to the router 502. An example of a router is the Blackmagic Design Videohub provided by Blackmagic Design Pty. Ltd. Of Fremont, Calif.

2. Stunt Switcher

The stunt switcher 504 may be configured to channel video by mapping inputs to outputs, and may include one or more inputs, including, for example, a first input 520 and a second input 522, and one or more outputs, including, for example, an output 524. The stunt switcher 504 may also include a user interface 528, a data storage 529, and a communication interface (not shown).

The inputs 520, 522, the output 524, the user interface 528, the data storage 529, and the communication interface may each be connected to each other by a connection mechanism (not shown). The router 502 may be connected to the stunt switcher 504 via the output 516 and the input 520. The router 502 may also be connected to the stunt switcher 504 via the output 518 and the input 522. Like a router, a stunt switcher may and often does have more inputs than outputs such that it may connect many sources to relatively fewer destinations. An example of a stunt switcher is the Miranda NVISION NVS5100MC provided by NVision, Inc. of Coppell, Tex.

The stunt switcher 504 may further be configured to perform various functions related to digital video effects (DVE). A DVE is an effect module (e.g., in the form of a set of program instructions) that is configured to be executed or "run." When run, a DVE dynamically manipulates video being channeled through the stunt switcher. Running a DVE may involve using one or more layers known as "keys" to overlay graphics, video, or other media on video. In some instances, running a DVE may involve simply "resetting" the keys, thereby removing any media being overlayed as a result of another DVE being run.

The stunt switcher 504 may be configured to assist a user in designing a DVE, such as via the user interface 528. Once a DVE is designed, the stunt switcher 504 may store the DVE in the data storage 529. In one example, the stunt switcher may store DVEs in respective DVE registers within the data storage 529. The stunt switcher 504 may also store media used in connection with the DVE in the data storage 529. This allows the stunt switcher 504 to retrieve media as needed. For example, when running a DVE, the stunt switcher 504 may retrieve media from a particular graphic or video register in the data storage 529 as indicated by the DVE. Media may be stored in the data storage 529 in a variety of manners, such as via a file transfer protocol (FTP). As such, by overwriting media stored in the data storage 529, the result of a DVE that is run may be changed.

Once a DVE is designed and stored in the data storage 529, the stunt switcher 504 may then retrieve and run the DVE. In some instances, this may occur in response to a request being received from a user (e.g., via the user interface 528) or from the automation system 508. Accordingly, when a stunt switcher runs a DVE, a VC that is being channeled through the stunt switcher 504 may be dynamically manipulated. This manipulated video may then be sent through the bypass switcher 506 and to the air-chain system 600 for broadcast as described in greater detail below.

3. Bypass Switcher

The bypass switcher 506 may be configured to channel video by mapping inputs to outputs. The bypass switcher 506 may include at least one input including, for example, a first input 530 and a second input 532, and at least one output including, for example, an output 534. The bypass switcher 506 may also include a communication interface (not shown). The inputs 530, 532, the output 534, and the communication interface may all be connected to each other by a connection mechanism (not shown). The stunt switcher 504 may be connected to the bypass switcher 506 via the output 524 and the input 530. A bypass switcher may and often does have multiple inputs and a single output such that it may connect many sources to relatively fewer destinations.

Accordingly, provided that the router 502, the stunt switcher 504, and the bypass switcher 506 all have the appropriate input-to-output mappings, a VC sent from the second RAPD 404 to the MCS 500 may be channeled through the entities in the MCS and sent out the MCS. Likewise, provided that the router 502, the stunt switcher 504, and the bypass switcher 506 all have the appropriate input-to-output mappings, streaming video sent from the SVS 300 to the MCS 500 may be channeled through the entities in the MCS and sent out the MCS.

In some instances, the distribution amplifier 304 may be connected directly to the bypass switcher 506 (e.g., via the output 314 and the input 532). This configuration may provide for a back-up solution in the event that a device such as the router 502 or stunt switcher 504 malfunctions. If such an event occurs while using this configuration, a master control operator may simply change the input-to-output mappings on the bypass switcher 506 to cause the streaming-video source 302 to send video to the air-chain system 600 for broadcast.

4. Automation System

The automation system 508 may be configured to perform or to cause performance of one or more functions related to the television-broadcasting system 100. The automation system 508 may include a processor 538, a data storage 540, a user-interface 542 (e.g., including a display device), and a communication interface 544, all of which may be connected by a connection mechanism (not shown). The processor 538 may include one or more general-purpose processors (e.g., microprocessors) and/or special-purpose processors (e.g., digital signal processors and/or application specific integrated circuits).

The data storage 550 may include one or more volatile and/or non-volatile storage components and may be integrated in whole or in part with the processor 538. The data storage 450 may take the form of a non-transitory computer-readable medium and may include a set of program instructions, that when executed by the automation system 508 (e.g., by the processor 538), cause performance of a set of functions. For example, the automation system 508 may cause the SVS 300, the RAPS 400, the MCS 500, the air-chain system 600, an entity included therein, and/or another entity to perform one of more of the functions described in this disclosure. The automation system 508 may cause such functions to be performed by sending instructions and/or other data via a corresponding communication interface and/or connection mechanism to the appropriate device.

The automation system 508 may receive data via the same path. In one example, the automation system 508 sends and receives data according to a video disk control protocol (VDCP). For example, the automation system 508 may receive from the bypass switcher 506, an indication of the input-to-output mappings used by the bypass switcher such that the automation system may determine whether the scheduled video was actually sent to the air-chain system 600 for broadcast. The automation system 508 may use these indications to generate an as-run log, which is a report of what was actually broadcast.

Figure 6:
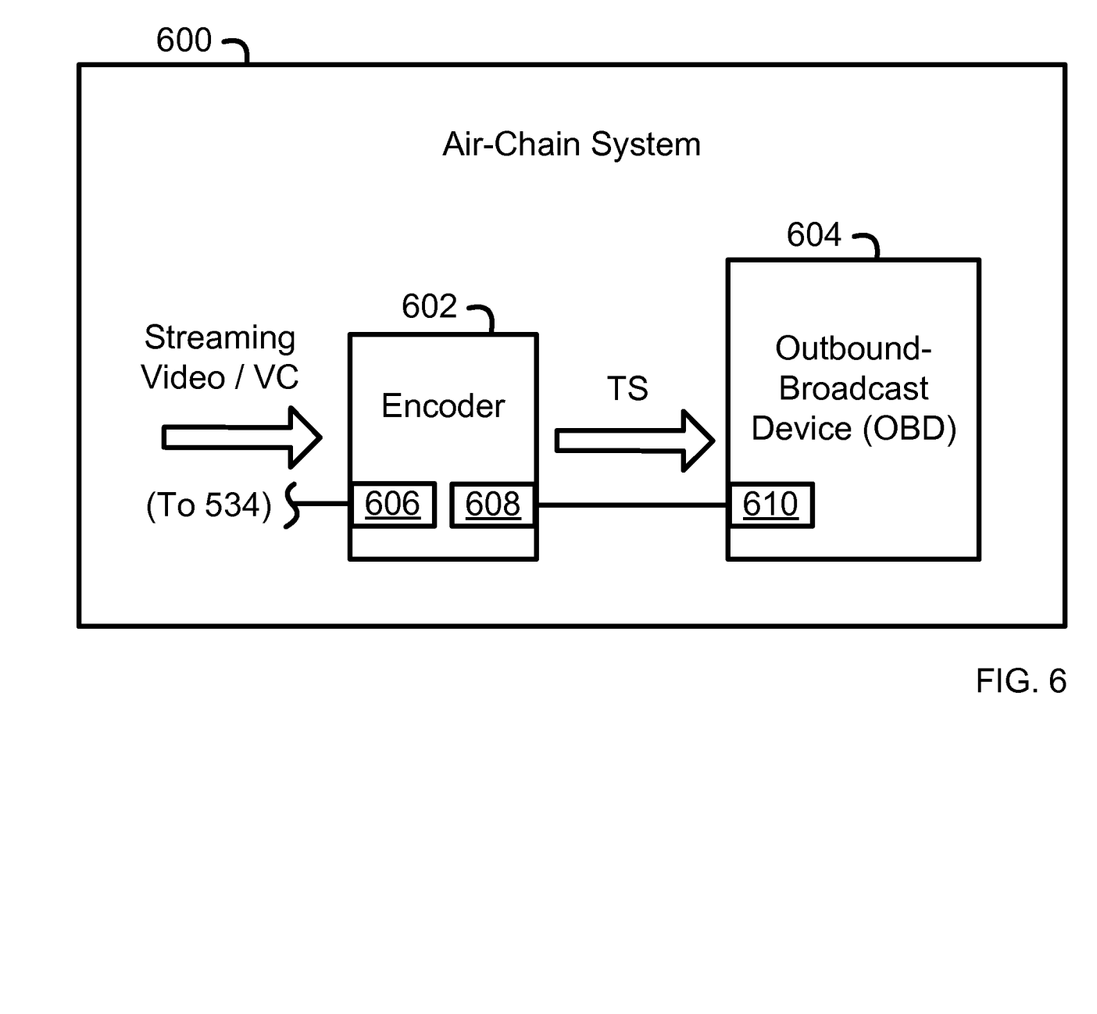
FIG. 6 is a simplified block diagram of an example air-chain system.

In some instances, the automation system 508 may perform functions described herein as being performed by the traffic system 200. Likewise, in some instances, the traffic system 200 may perform functions described herein as being performed by the automation system 508. This may be the case, for example, where the traffic system 200 and the automation system 508 operate using a "live log" approach, where the traffic system 200 may be configured to query the automation system 508, manage the log and make scheduling-related decisions itself, and provide log entries (perhaps one at a time) to the automation system for processing E. Air-Chain System FIG. 6 shows the air-chain system 600 in greater detail. The air-chain system 600 may be configured to prepare and broadcast video received from the MCS 500 to an audience. The air-chain system 600 may include an encoder 602 and an outbound-broadcast device (OBD) 604.

The encoder 602 may be configured to receive video from a source entity, generate a transport stream (TS) (that includes the video), and send the generated TS to a destination entity. The TS may be described as including video, meaning that the TS includes the encoded representation of the video, among other things. The encoder 602 may include an input 606 and an output 608, each of which may be connected by a connection mechanism (not shown). The bypass switcher 506 may be connected to the encoder 602 via the output 534 and the input 606.

In one example, the encoder 602 may generate a TS by, among other things, encoding video based on the HD-SDI standard to video based on the MPEG 2 standard. An example of an encoder is the NetVX provided by Harris Corporation of Melbourne, Fla.

The OBD 604 may be configured to receive a TS from a source entity, and broadcast the TS (i.e., including video) to multiple destination entities for viewing by an audience. The OBD 604 may include an input 610, and the encoder 602 may be connected to the OBD via the output 608 and the input 610.

It should be noted that the term television-broadcast as used in this disclosure refers broadly to the distribution of video to an audience, and is not meant to be limited to distribution of video in any particular manner. Accordingly, the OBD 604 may take the form of a transmitter, satellite, or terrestrial fiber transmitter (e.g., any of which may correspond with a service provider). As another example, the OBD 604 may also take the form of a network connection (e.g., for broadcasting the TS to an audience via the Internet).

The television-broadcasting system 100 described above is one non-limiting example. Indeed, the disclosed systems may include some or all of the entities discussed above, and may be arranged in different ways as would be apparent to one of ordinary skill in the art.

III. Example Methods

Figure 7A:
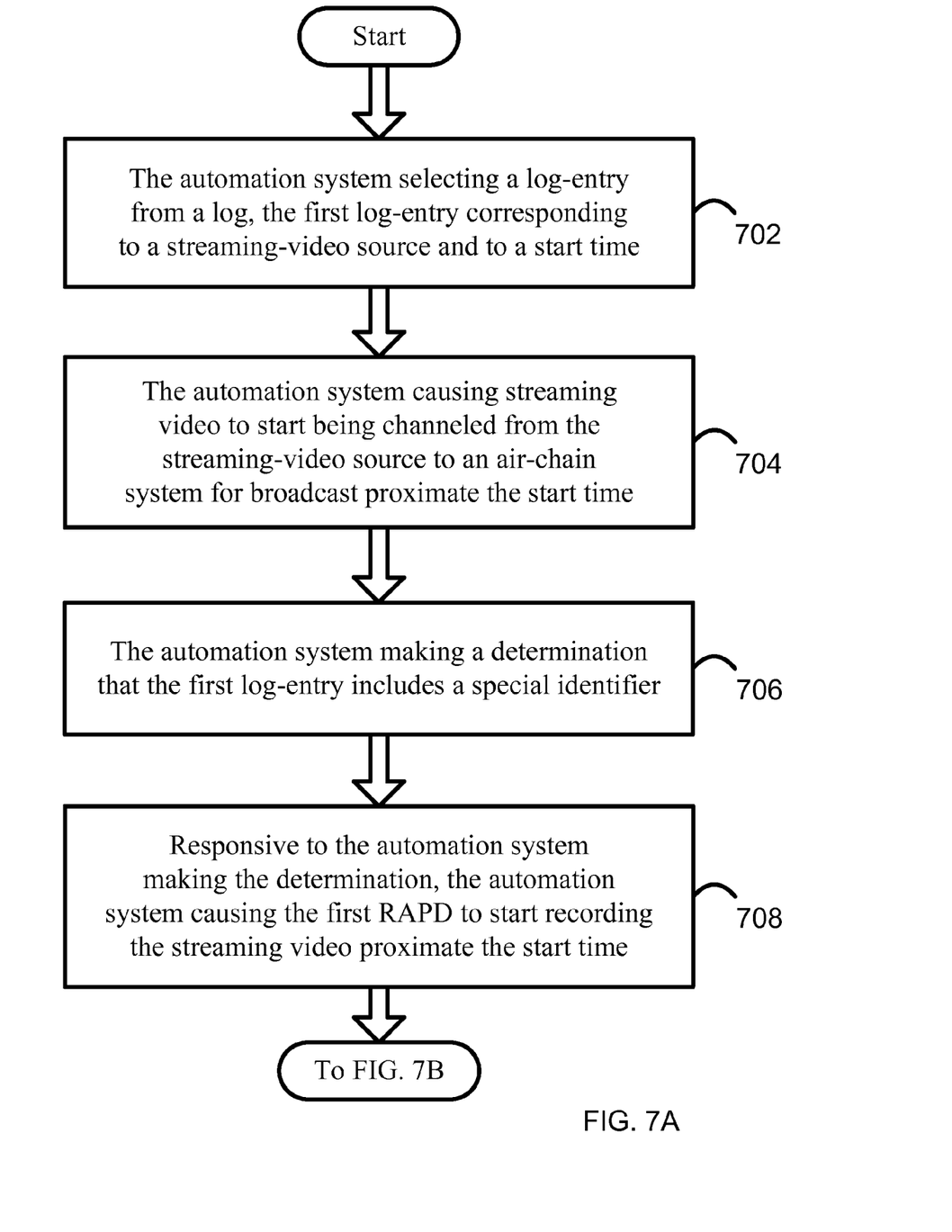
FIG. 7A shows a first part of a flow chart illustrating functions in accordance with an example method.
Figure 7B:
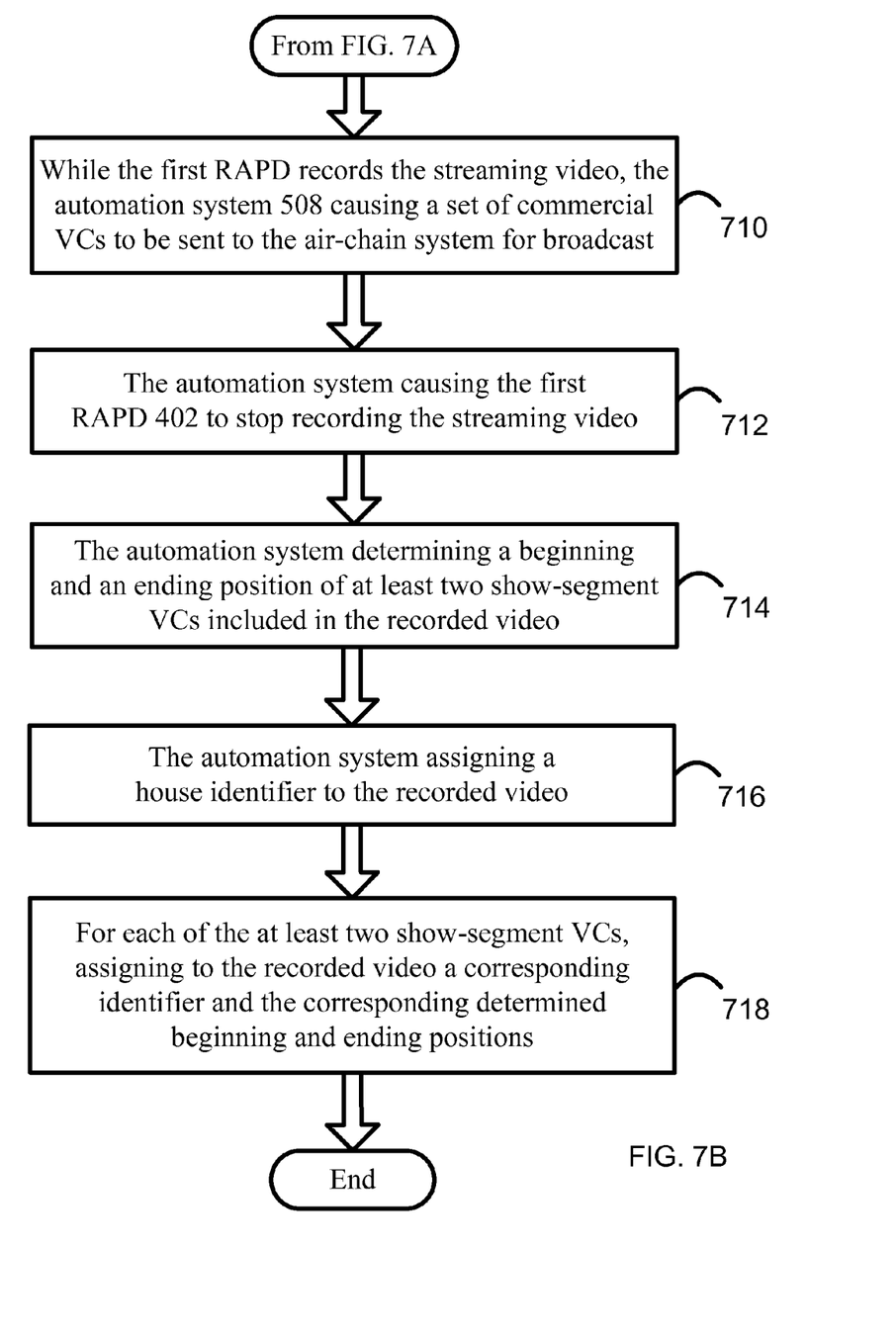
FIG. 7B shows a second part of the flow chart of FIG. 7A.

FIGS. 7A and 7B show a flow chart illustrating functions in accordance with an example method. At block 702, the method may involve the automation system 508 selecting (i.e., retrieving or accessing) a log entry from a log. The log entry may correspond to a streaming-video source. For instance, the log entry may include a source identifier that identifies the streaming-video source 302. The log entry may also correspond to a start time and a duration.

The automation system 508 may select the log entry proximate (at or near) the start time. However, in some instances the automation system 508 may select the log entry "ahead of schedule" (e.g., three hours before the start time). This may allow the automation system 508 and/or another entity to perform or prepare to perform certain functions in advance of the start time.

At block 704, the method may involve the automation system 508 causing streaming video to start being channeled from the streaming-video source 302 to the air-chain system 600 for broadcast proximate the start time. In one example, this may involve the automation system 508 sending a request to the router 502 and/or the stunt switcher 504 to map appropriate inputs to outputs such that streaming video provided by the streaming-video source 302 may be channeled to the air-chain system 600 for broadcast. Provided that the start time is set in accordance with a scheduling protocol used by the streaming-video provider, the streaming video starting at the start time and ending after the duration has lapsed may be a show-segment VC. In other words, the log entry may correspond to a show-segment VC.

At block 706, the method may involve the automation system 508 making a determination that the log entry includes a special identifier. The automation system may make this determination by determining that there is a value in an auxiliary-notation field of the log entry, or perhaps by determining that a value in the log entry has a predetermined property (e.g., a particular prefix). For example the automation system may determine that the value "FT=AB1234" stored in the auxiliary-notation field of the log entry is a special identifier because it includes an "FT=" prefix. In one example, the remaining portion of the special identifier, namely "AB1234" may be used in connection with other functions as described below.

At block 708, the method may involve responsive to the automation system 508 making the determination, the automation system 508 causing the first RAPD 402 (or another recording device) to start recording the streaming video proximate the start time. In one example, this may involve the automation system 508 sending a request to the first RAPD 402 to cause it to start recording the streaming video being sent from the streaming-video source 302. As such, the first RAPD 402 may start recording the streaming video at the same time that the streaming video starts being channeled to the air-chain system 600 for broadcast.

As discussed above, the automation system 508 may process log entries according to their corresponding start times. As such, once the automation system 508 completes processing the log entry (e.g., after its duration has lapsed), the automation system may continue down the log and process subsequent log entries, including for example, log entries that correspond to commercial VCs or additional show-segment VCs. During this time, the first RAPD 402 may continue to record the streaming video (even during any commercial breaks occurring between show-segments VCs).

As such, at block 710, the method may involve while the first RAPD 402 records the streaming video, the automation system 508 causing a set of commercial VCs to be sent to the air-chain system 600 for broadcast. This may involve the automation system 508 sending a request to the RAPS 400, which in turn causes the first RAPD 402 to retrieve the commercial VCs and send them via the MCS 500 to the air-chain system 600. This may involve the automation system 508 sending a request to the router 502 and/or the stunt switcher 504 to modify input to output mapping as described above.

At block 712, the method may involve the automation system 508 causing the first RAPD 402 to stop recording the streaming video. In one example, this may involve the automation system 508 sending a request to the first RAPD 402 to stop recording the streaming video. The automation system may cause the first RAPD 402 to stop recording the streaming video when one show ends and another begins (i.e., at a point in the log between one group of log entries and another group of log entries). The automation system 508 may determine that this occurs by determining a change between descriptions included in a pair of log entries (e.g., from one show title to another).

At block 714, the method may involve the automation system 508 determining a beginning and an ending position of at least two show-segment VCs included in the recorded video. As noted, the at least two show-segment VCs may be separated by a commercial break. Since the streaming video is constantly being provided by the streaming-video source 302, a timing of the commercial break corresponds to a timing of the sending of the set of commercial VCs to the air-chain system 600. In other words, the commercial break in the streaming video occurs while the set of commercial VCs are being broadcast. This and/or other information may allow the automation system 508 to determine the starting and ending positions of the at least two show-segment VCs included in the recorded video.

For example, consider that the log entry is a first log-entry that corresponds to a first show-segment VC, and that the first log-entry is followed by second, third, fourth, fifth, sixth, and seventh log entries. Further consider that the second, third, fourth, and fifth log entries correspond to commercial VCs and that the sixth log-entry corresponds to the streaming-video source 302 (as with the first log-entry) that includes a second show-segment VC of the same show. Finally, consider that the seventh log entry corresponds to a show-segment VC of a different show. In this example, the automation system 508 may determine that the beginning time of the first show-segment VC is the time when the streaming video starts being recorded, and the ending time of the first show-segment VC is the start time of the second log entry (i.e., immediately before the start of the commercial break). The automation may also determine that the beginning time of the second show-segment VC is the start time of the sixth log-entry (i.e., immediately after the end of the commercial break), and that the ending time of the second log entry is immediately before the start time of the seventh log entry.

The example above has been provided for illustration purposes only. It should be noted that it is common for a show to include more than two show-segments. In such instances, the beginning and ending times may depend on the beginning and ending times of adjacent commercial breaks. Further, in one example, the beginning and ending positions may be converted to relative times expressed as a displacement from the beginning of the recorded video (i.e., represented in this context as a "time zero"). Also, in one example, the automation system 508 may determine the beginning and ending positions of the show-segment VCs as the streaming video is being recorded (i.e., before the function at block 712).

At block 716, the method may involve assigning a house identifier to the recorded video. In one example, the assigned house number is a portion of the special identifier. For example, referring back to the example special identified provided above, the automation system 508 may assign the recorded video a house number "AB1234." By assigning the recorded video a house number, the recorded video is effectively converted into a stored VC, and therefore it may be scheduled in another log as any other VC would be scheduled (e.g., with a log entry that includes a house identifier and a segment identifier, among other things.)

However, since the recorded video may include multiple show-segments VCs as discussed above, it may be desired to assign additional attributes to the recorded video such that individual show-segment VCs may be referenced in separate log entries. As such, at block 718, the method may involve for each of the at least two show-segment VCs included in the recorded video, assigning a corresponding segment identifier (e.g., "1", "2", etc.) and the corresponding determined beginning and ending positions to the recorded video. Such attributes may be assigned to the recorded video by adding values to a mapping table, for instance.

IV. Example Variations

While one or more functions of the disclosed methods have been described as being performed by the certain entities (e.g., the automation system 508), the functions may be performed by any entity, such as those included in the television-broadcasting system 100 described above. Further, the described steps throughout this application need not be performed in the disclosed order, although in some examples, an order may be preferred. Also, not all steps need to be performed to achieve the desired advantages of the disclosed systems and methods, and therefore not all steps are required. Further, the variations described throughout this disclose may be applied to any of the disclosed systems or methods.

Further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A method comprising:
   selecting a log-entry from a traffic log, wherein the log-entry corresponds to a streaming-video source and to a start time;
   causing streaming video to start being channeled from the streaming-video source to an air-chain system for broadcast proximate the start time;
   making a determination that the log-entry includes a special identifier;
   responsive to making the determination, causing a recording device to start recording the streaming video proximate the start time;
   while the recording device records the streaming video, causing a set of commercial video components (VCs) to be sent to the air-chain system;
   causing the recording device to stop recording the streaming video;
   determining a beginning and an ending position of at least two show-segment VCs included in the recorded video, wherein the at least two show-segments are separated by a commercial break, and wherein a timing of the commercial break corresponds to a timing of the sending of the set of commercial VCs to the air-chain system; and
   for each of the at least two show-segment VCs included in the recorded video, assigning to the recorded video a corresponding segment identifier and the corresponding determined beginning and ending positions.

2. The method of claim 1, further comprising:
assigning a house identifier to the recorded video.

3. The method of claim 2, wherein the assigned house-identifier is a portion of the special identifier.

4. The method of claim 1, wherein the log-entry includes an auxiliary-notation field and wherein the special identifier is stored in the auxiliary-notation field.

5. The method of claim 1, wherein making the determination that the log-entry includes a special identifier comprises determining that a value included in the log-entry includes a predetermined prefix.

6. The method of claim 1, wherein causing the recording device to stop recording the streaming video comprises determining a change between descriptions included in a pair of log-entries in the log.

7. The method of claim 1, wherein the streaming video is channeled from the streaming-video source to the air-chain system for broadcast while the recording device records the streaming video.

8. A method for use in a television-broadcasting system having an automation system, the method comprising:
the automation system selecting a log-entry from a traffic log, wherein the log-entry corresponds to a streaming-video source and to a start time;
the automation system causing streaming video to start being channeled from the streaming-video source to an air-chain system for broadcast proximate the start time;
the automation system making a determination that the log-entry includes a special identifier;
responsive to the automation system making the determination, the automation system causing a recording device to start recording the streaming video proximate the start time;
while the recording device records the streaming video, the automation system causing a set of commercial video components (VCs) to be sent to the air-chain system for broadcast;
the automation system causing the recording device to stop recording the streaming video; and
the automation system determining a beginning and an ending position of at least two show-segment VCs included in the recorded video, wherein the at least two show-segments are separated by a commercial break, and wherein a timing of the commercial break corresponds to a timing of the sending of the set of commercial VCs to the air-chain system; and
for each of the at least two show-segment VCs included in the recorded video, the automation system assigning to the recorded video a corresponding segment identifier and the corresponding determined beginning and ending positions.

9. The method of claim 8, further comprising:
the automation system assigning a house identifier to the recorded video.

10. The method of claim 9, wherein the assigned house-identifier is a portion of the special identifier.

11. The method of claim 8, wherein the log-entry includes an auxiliary-notation field and wherein the special identifier is stored in the auxiliary-notation field.

12. The method of claim 8, wherein the automation system making the determination that the log-entry includes a special identifier comprises the automation system determining that a value included in the log-entry includes a predetermined prefix.

13. The method of claim 8, wherein the automation system causing the recording device to stop recording the streaming video comprises the automation system determining a change between descriptions included in a pair of log-entries in the log.

14. The method of claim 8, wherein the streaming video is channeled from the streaming-video source to the air-chain system for broadcast while the recording device records the streaming video.

15. A television-broadcasting system comprising:
a streaming-video source;
an air-chain system connected to the streaming-video source;
a recording device connected to the streaming-video source; and
an automation system having a computer-readable medium including a set of program instructions, that when executed by the automation system, cause the automation system to perform a set of functions comprising:
selecting a log-entry from a traffic log, wherein the log-entry corresponds to the streaming-video source and to a start time;
causing streaming video to start being channeled from the streaming-video source to the air-chain system for broadcast proximate the start time;
making a determination that the log-entry includes a special identifier;
responsive to making the determination, causing the recording device to start recording the streaming video proximate the start time;
while the recording device records the streaming video, causing a set of commercial VCs to be sent to the air-chain system for broadcast;
causing the recording device to stop recording the streaming video; and
determining a beginning and an ending position of at least two show-segment video components (VCs) included in the recorded video, wherein the at least two show-segments are separated by a commercial break, and wherein a timing of the commercial break corresponds to a timing of the sending of the set of commercial VCs to the air-chain system; and
for each of the at least two show-segment VCs included in the recorded video, assigning to the recorded video a corresponding segment identifier and the corresponding determined beginning and ending positions.

16. The television-broadcasting system of claim 15, the set of functions further comprising:
assigning a house identifier to the recorded video.

17. The television-broadcasting system of claim 16, wherein the assigned house-identifier is a portion of the special identifier.

18. The television-broadcasting system of claim 15, wherein the log-entry includes an auxiliary-notation field and wherein the special identifier is stored in the auxiliary-notation field.

19. The television-broadcasting system of claim 15, wherein making the determination that the log-entry includes a special identifier comprises determining that a value included in the log-entry includes a predetermined prefix.

20. The television-broadcasting system of claim 15, wherein causing the recording device to stop recording the streaming video comprises determining a change between the descriptions included in a pair of log-entries in the log.

* * * * *